(12) United States Patent
Choho (10) Patent No.: US 9,335,812 B2
(45) Date of Patent: May 10, 2016

(54) INFORMATION PROCESSING APPARATUS AND METHOD FOR CONTROLLING THE INFORMATION PROCESSING APPARATUS

(71) Applicant: CANON KABUSHIKI KAISHA, Tokyo (JP)

(72) Inventor: Satoshi Choho, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 14/053,039

(22) Filed: Oct. 14, 2013

(65) Prior Publication Data

US 2014/0108843 A1    Apr. 17, 2014

(30) Foreign Application Priority Data

Oct. 17, 2012   (JP) ................................. 2012-229494

(51) Int. Cl.
G06F 1/32 (2006.01)

(52) U.S. Cl.
CPC ............ G06F 1/3234 (2013.01); G06F 1/3228 (2013.01); G06F 1/3284 (2013.01); *Y02B 60/1267* (2013.01); *Y02B 60/32* (2013.01)

(58) Field of Classification Search
CPC ... G06F 1/3234; G06F 1/3228; G06F 1/3284; Y02B 60/1267; Y02B 60/32
See application file for complete search history.

(56) References Cited

U.S. PATENT DOCUMENTS

| | | | | |
|---|---|---|---|---|
| 5,913,067 A | * | 6/1999 | Klein | 713/300 |
| 2002/0032040 A1 | * | 3/2002 | Tsukamoto | 455/556 |
| 2011/0150431 A1 | * | 6/2011 | Klappert | 386/296 |
| 2012/0030491 A1 | * | 2/2012 | Itou | 713/323 |

FOREIGN PATENT DOCUMENTS

JP         3564925 B2     9/2004

* cited by examiner

*Primary Examiner* — Dennis M Butler
(74) *Attorney, Agent, or Firm* — Canon U.S.A., Inc. IP Division (57) ABSTRACT

An information processing apparatus operable in a standby mode and in a sleep mode. The information processing apparatus comprising a sleep unit and, a power-off unit. The sleep unit configured to shift the information processing apparatus into the sleep mode if a first time has elapsed in the standby mode. The power-off unit configured to turn off the power supply of the information processing apparatus if a second time has elapsed in the sleep mode and configured to turn off the power supply of the information processing apparatus at a specified time. The power-off unit configured to turn off the power supply of the information processing apparatus without waiting for the second time if the information processing apparatus has been started after the time specifying power-off processing.

9 Claims, 10 Drawing Sheets

INFORMATION PROCESSING APPARATUS AND METHOD FOR CONTROLLING THE INFORMATION PROCESSING APPARATUS

BACKGROUND OF THE INVENTION

1. Field of the Invention

The present invention relates to information processing apparatuses and methods for controlling the information processing apparatuses.

2. Description of the Related Art

There exists an information processing apparatus that enters a power-off mode when it is detected that the apparatus is left unoperated for a predetermined period of time (i.e., auto power-off). In the power-off mode, a power supply switch of the apparatus is turned off to shut down the power supply.

According to a technique discussed in Japanese Patent No. 3,564,925, if it is detected that an apparatus is being left unoperated for a predetermined period of time (i.e., auto power-off time), a power supply switch is turned off (i.e., auto power-off). Then, a time that has elapsed from the auto power-off until turn-on of the power supply switch is measured (i.e., measurement time). If the sum of the measurement time and the auto power-off time falls below a reference value, the auto power-off time is corrected so that the sum exceeds the reference value.

However, according to the technique discussed in Japanese Patent No. 3,564,925, even if a short duration is set as the auto power-off time when use of the apparatus is started, at the time that the auto power-off is repeated, the auto power-off time may be extended. Then, if the auto power-off time is long at the time that use of the apparatus is finished, the apparatus may be powered off after being left unoperated for a long period of time.

On the other hand, there exists an apparatus that enters a sleep mode, when it is detected that the apparatus is being left unoperated for a predetermined period of time, in order to suppress power consumption of the apparatus (i.e., auto sleep). Many apparatuses enable a user to set such a predetermined period for the sake of convenience.

There also exists a technique in which time to finish using an apparatus is preset and a power supply switch of the apparatus is turned off at the predetermined time to shut down the power supply (i.e., time specifying power-off).

If the power supply is shut down through the auto power-off, a user needs to manually turn on the power supply switch to use the apparatus again. Therefore, the user tends to set the auto power-off time longer in order to avoid such a situation. In this case, unnecessary power is consumed for a long period of time until the power supply is shut down.

Furthermore, if a plurality of users shares an apparatus, it may be difficult to determine which user is the last one to use the apparatus, and thus none of the users manually turns off the power supply switch, and the apparatus may be left without shutting down the power supply. Therefore, the power supply switch of the apparatus may be turned off through the time specifying power-off. However, the user may turn on the power supply switch after the time specifying power-off to use the apparatus.

As mentioned above, it is possible that a user who normally does not turn off the power supply manually after use of the apparatus, may turn on the power supply switch after the time specifying power-off. In this case, the user may leave the apparatus as it is after finishing an operation of the apparatus. In such a case, since it is possible that a plurality of users shares the apparatus, the apparatus is first brought into the sleep mode through the auto sleep processing. Then, the power supply may be shut down through the auto power-off, or if a user continues using the apparatus, control may be carried out so that the power supply is not shut down until the next specified time. However, also in this case, the apparatus is left in the sleep mode for a long period of time until the power supply is shut down through the auto power-off, resulting in unnecessary power consumption.

SUMMARY OF THE INVENTION

The present invention is directed to a mechanism in which, when an apparatus that has been powered off automatically at a specified time is restarted, the power supply of the apparatus can be shut down reliably at an optimal timing that does not decrease user-friendliness of the apparatus and suppresses unnecessary power consumption.

According to an aspect of the present invention, an information processing apparatus operable in a standby mode and in a sleep mode, the information processing apparatus comprising:
an sleep unit configured to shift the information processing apparatus into the sleep mode if a first time has elapsed in the standby mode; and
a power-off unit configured to turn off the power supply of the information processing apparatus if a second time has elapsed in the sleep mode and configured to turn off the power supply of the information processing apparatus at a specified time; wherein the power-off unit configured to turn off the power supply of the information processing apparatus without waiting for the second time if the information processing apparatus has been started after the time specifying power-off processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following description, an image forming apparatus such as a printer and a multifunction peripheral is illustrated as an example of the information processing apparatus. However, the information processing apparatus and an external apparatus are not limited to these examples. Power-off processing in the following description refers to processing for turning off a power supply of an apparatus and may include a shutdown of the apparatus and a shutoff of the power supply to the apparatus. The shutdown of the apparatus may include closing of files, termination of application programs, disconnection of communication with various input/output devices, and termination of an operating system (OS).

Figure 1:
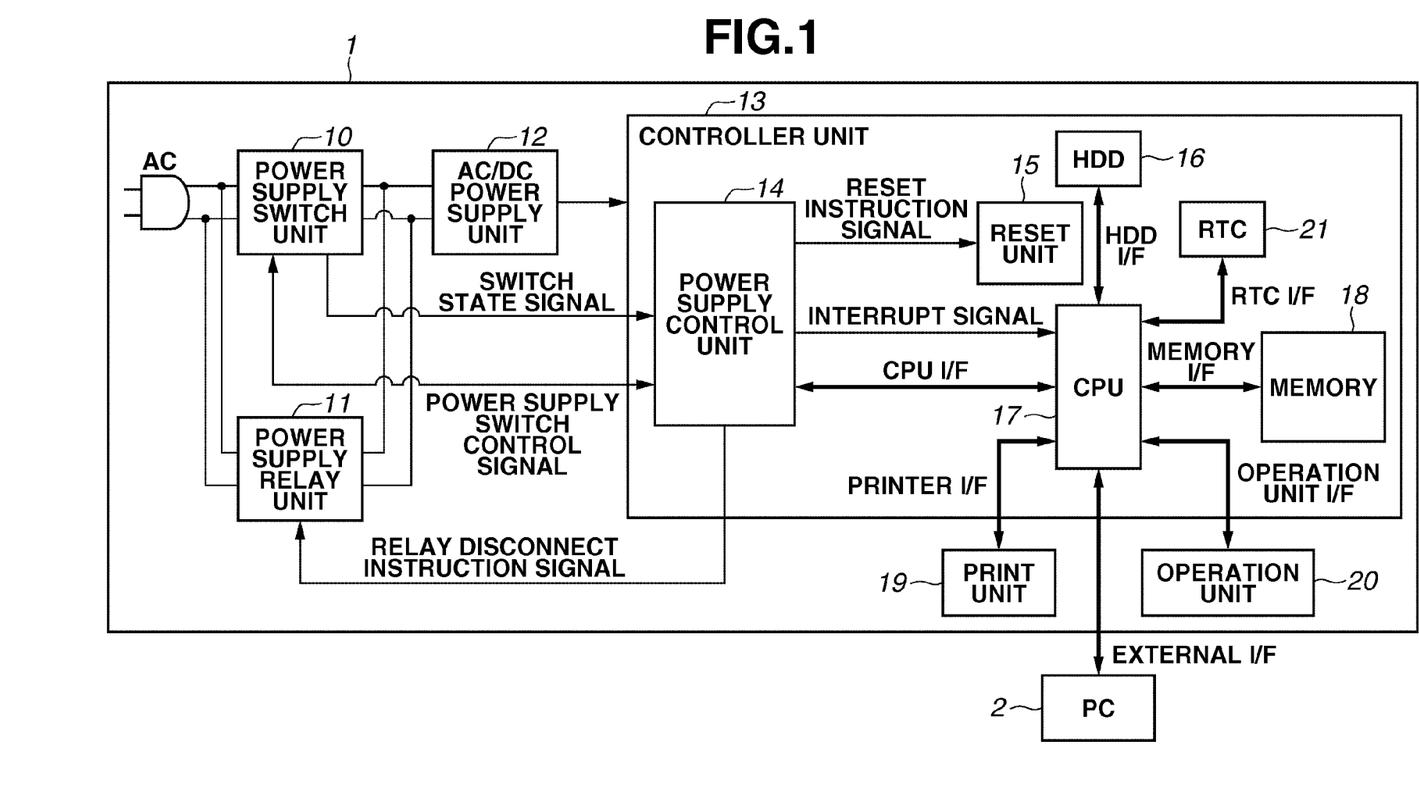
FIG. 1 is a block diagram illustrating an exemplary configuration of an information processing apparatus according to a first exemplary embodiment of the present invention.

FIG. 1 is a block diagram illustrating an exemplary configuration of an information processing apparatus according to a first exemplary embodiment of the present invention. A printer 1 is an image forming apparatus serving as an exemplary embodiment of the information processing apparatus of the present invention. The printer 1 is operable in a standby mode that can carry out information processing (e.g., print processing) and in a sleep mode that saves power consumption, which will be described later in further detail.

The printer 1 is connected to a personal computer (PC) 2 through an external interface (I/F) such that the printer 1 can communicate with the PC 2 through a network. The printer 1 can receive time information from the PC 2.

The printer 1 includes a power supply switch unit 10, a power supply relay unit 11, an alternate current (AC)/direct current (DC) power supply unit 12, a controller unit 13, a print unit 19, and an operation unit 20.

The power supply switch unit 10 includes a power supply switch (main switch) for giving an instruction to turn on/off electric power from an AC power supply. The power supply switch is a solenoid switch. The solenoid switch includes a switch and an actuator, and the switch can be turned off manually or automatically. The actuator includes a solenoid and a core, which is disposed inside the solenoid. When a current flows in the solenoid, the core is operated, so that the switch can be turned off automatically. The power supply switch unit 10 also has a function of notifying a power supply control unit 14 of an on/off state of the power supply switch.

The power supply relay unit 11 is provided to supply AC power to the AC/DC power supply unit 12 from outside based on a signal from the power supply control unit 14 even when the power supply switch is off.

The AC/DC power supply unit 12 converts the externally supplied AC power to a DC power and supplies the DC power to devices such as the controller unit 13 and the print unit 19. The controller unit 13 includes the power supply control unit 14, a reset unit 15, an HDD 16, a central processing unit (CPU) 17, a memory 18, and a real time clock (RTC) 21.

The power supply control unit 14 detects the on/off state of the power supply switch and outputs signals instructing processing such as power-off, reset, and power supply off processing. The reset unit 15 carries out reset processing on the entire hardware of the controller unit 13 based on a reset instruction signal from the power supply control unit 14 when, for example, the computer system is to be restarted.

The HDD 16 computer-readably records (or stores) various pieces of software and data to be executed by the computer system. The software to be stored in the HDD 16 includes an OS and various application programs (control programs) for carrying out information processing specific to the apparatus. The various control programs include a control program that is related to power-off processing. The data to be stored in the HDD 16 includes a time until auto sleep is executed, a time until auto power-off is executed, and a time that the time specifying power-off is executed (see FIG. 4). Instead of the HDD 16, other storage devices such as a solid state drive (SSD) may be used.

The CPU 17 reads the programs and the data stored in the HDD 16 and executes the programs. The CPU 17 carries out power-off processing and reset processing based on instruction signals from the power supply control unit and also controls the entire system related to the printer 1. In addition, the CPU 17 is internally equipped with a timer interrupt function and controls various timers.

The memory 18 is formed by a volatile memory such as a double-data rate synchronous dynamic random access memory (DDR SDRAM) and serves as a work area for the CPU 17. The memory 18 also includes a work area for storing a setting value of an auto sleep timer and a setting value of an auto power-off time.

The print unit 19 carries out print processing under the control of the CPU 17. When the printer 1 enters the sleep mode, the CPU 17 shuts off the power supply to the print unit 19 through a printer I/F.

The operation unit 20 includes a display screen and an input button and accepts various operations from an operator. An operation unit I/F notifies the CPU 17 of the operation information of the operation unit 20 and transmits data to be displayed in the display screen of the operation unit 20. The operation unit 20 displays, in the display screen, the screen data that has been received through the operation unit I/F. When the printer 1 enters the sleep mode, the CPU 1 causes the display screen to black out through the operation unit I/F.

The CPU 17 starts a first timer (auto sleep timer) and a second timer (auto power-off timer) based on the operation information from the operation unit 20 or the execution information of the print processing.

The real time clock (RTC) 21 is a typical RTC chip and performs time management. The CPU 17 can obtain the time through an RTC I/F. At the time of startup, the CPU 17 obtains a startup time from the RTC 21 and makes a startup time determination to determine the startup state.

Figure 2:
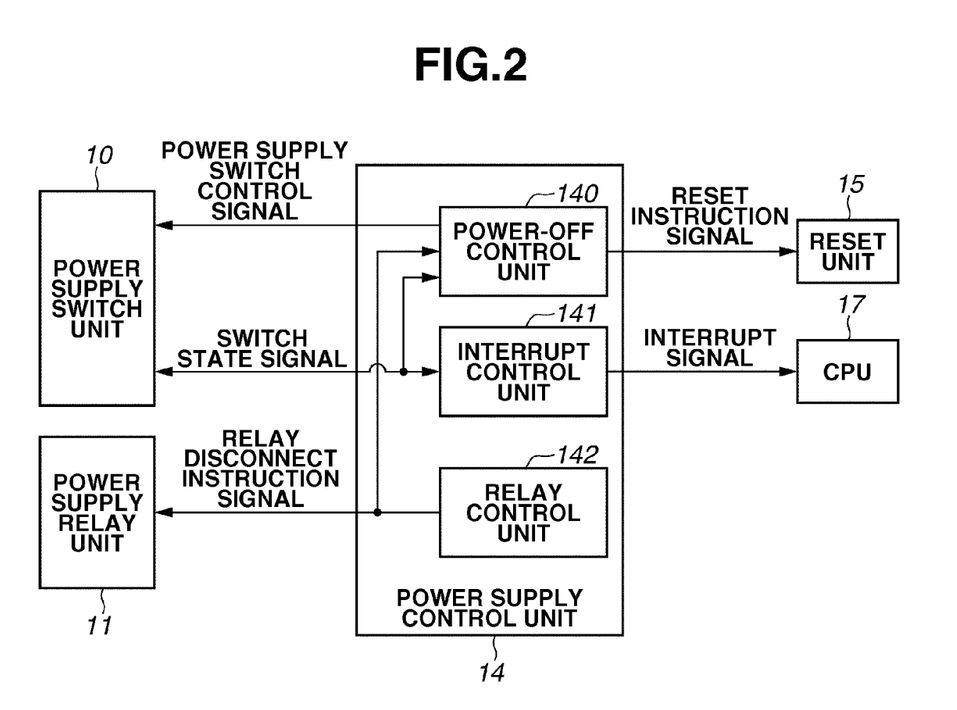
FIG. 2 is a block diagram illustrating an exemplary configuration of a power supply control unit illustrated in FIG. 1.

FIG. 2 is a block diagram illustrating an exemplary configuration of the power supply control unit 14 illustrated in FIG. 1. As illustrated in FIG. 2, the power supply control unit 14 includes a power-off control unit 140, an interrupt control unit 141, and a relay control unit 142. The power-off control unit 140 receives a switch state signal from the power supply switch unit 10 and a relay disconnect instruction signal from the relay control unit 142. Then, if the power-off control unit 140 determines that it is the auto power-off or the time specifying power-off based on the switch state signal and the relay disconnect instruction signal, the power-off control unit 140 outputs, to the power supply switch unit 10, a power supply switch control signal to cause the power supply switch unit 10 to carry out power off processing.

In a case where the switch state signal changes from an ON state to an OFF state and then changes back to the ON state, the power-off control unit 140 outputs the reset instruction signal to the reset unit 15 to reset the hardware. Thus, the CPU 17 can restart the system in a state where the hardware is reset.

The interrupt control unit 141 receives the switch state signal of the power supply switch from the power supply switch unit 10 and monitors the ON/OFF state of the power supply switch. In a case where the power supply switch changes from the ON state to the OFF state, the interrupt control unit 141 asserts an interrupt signal to the CPU 17 and thus notifies the CPU 17 that the power supply switch has been turned off.

The relay control unit 142 outputs the relay disconnect (off) instruction signal to the power supply relay unit 11 based on an instruction signal from the CPU 17.

Figure 3:
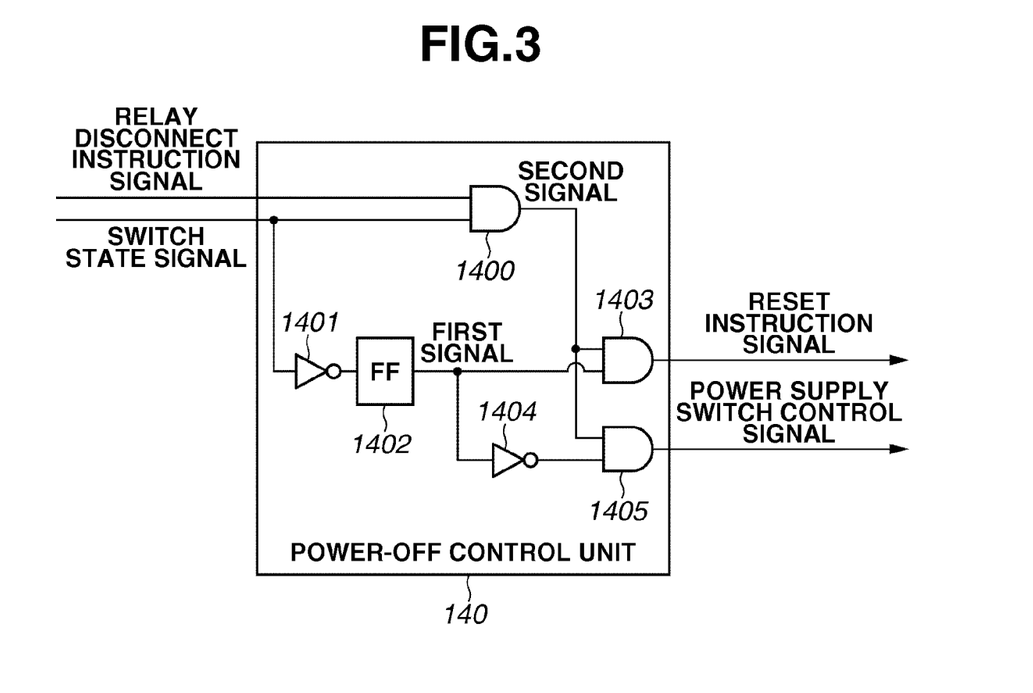
FIG. 3 is a block diagram illustrating an internal configuration of a power-off control unit of the first exemplary embodiment.

FIG. 3 is a block diagram illustrating an internal configuration of the power-off control unit 140 of the first exemplary embodiment. As illustrated in FIG. 3, the power-off control unit 140 includes AND circuits 1400, 1403, and 1405, NOT circuits 1401 and 1404, and a flip-flop (FF) circuit 1402.

The AND circuit 1400 outputs, to the AND circuits 1403 and 1405, a logical product of the relay disconnect instruction signal and the switch state signal as a second signal. The NOT circuit 1401 inverts the switch state signal and inputs the inverted signal to the flip-flop circuit 1402.

The flip-flop circuit 1402 retains a state of changes between ON and OFF of the switch state signal and outputs that state of the changes to the AND circuits 1403 and 1405 as a first signal. The first signal is output to the AND circuit 1405 through the NOT circuit 1404.

The AND circuit 1403 outputs a signal to the reset unit 15 as the reset instruction signal. The AND circuit 1405 outputs a signal to the power supply switch unit 10 as the power supply switch control signal.

Figure 4:
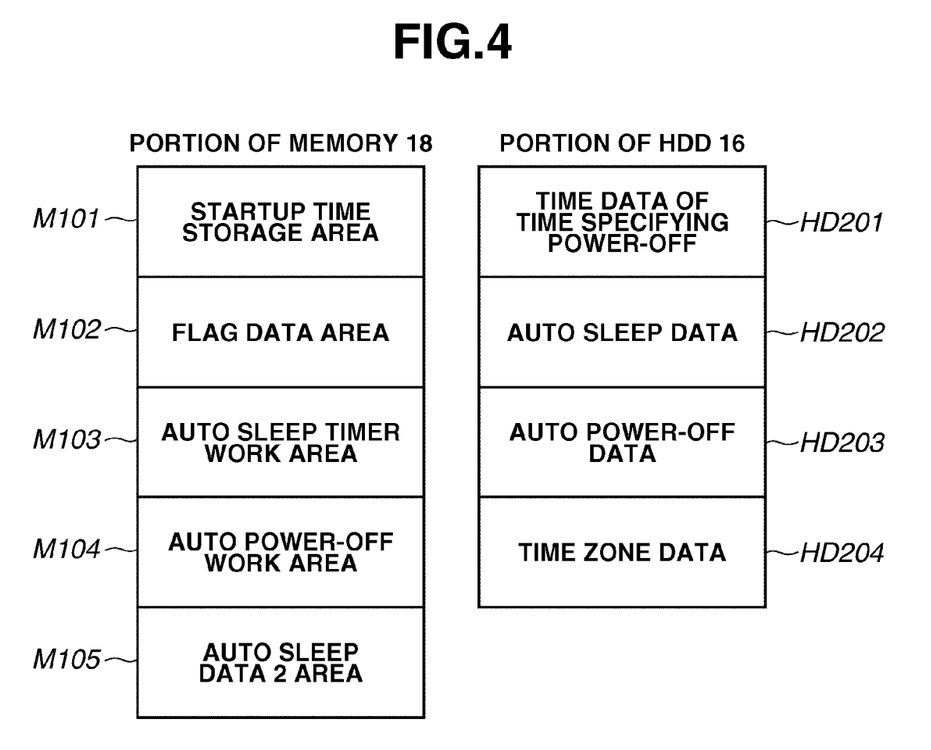
FIG. 4 illustrates portions of recording areas of a memory and a hard disk drive (HDD), respectively, illustrated in FIG. 1.

FIG. 4 illustrates portions of recording areas of the memory 18 and the HDD 16, illustrated in FIG. 1. The HDD 16 includes an area HD201 for storing time data for time specifying power-off, which is set in advance by the operation unit 20. In the time specifying power-off, the power supply of the printer 1 is turned off at a specified time set in advance (i.e., time specifying power-off processing).

The HDD 16 also includes an area for storing a time (auto sleep data HD202 (first time)) that the auto sleep is to be carried out, and the time is set in advance by the operation unit 20. In auto sleep processing, if an auto sleep time (i.e., first time) elapses in the standby mode without detecting an operation in the operation unit 20 or without performing any information processing (e.g., print processing), the operation mode of the apparatus is switched from the standby mode to the sleep mode.

The HDD 16 further includes an area for storing a time (auto power-off data HD203 (second time)) set in advance by the operation unit 20 for carrying out the auto power-off. In the auto power-off, if the auto power-off time (i.e., second time) elapses while remaining in the sleep mode, the power supply of the printer 1 is turned off (first power-off processing). Time zone data HD204 will be described in a second exemplary embodiment.

The memory 18 includes a startup time storage area M101 for storing the time that is obtained from the RTC 21 at the time of startup. The memory 18 also includes a flag data area M102 in which "0" or "1" is written through startup time determination processing. In the startup time determination processing, the time data HD201 for the time specifying power-off stored in the HDD 16 is compared with the startup time stored in the startup time storage area M101. Then, if the startup time precedes the time specifying power-off, "0" is written in the flag data area M102, otherwise, "1" is written therein.

An auto sleep timer work area M103 serves as an area in which the auto sleep data HD202 is written when the auto sleep timer is started. The auto sleep data in the auto sleep timer work area M103 is subtracted in response to a timer interrupt of the CPU 17, and the auto sleep is carried out when the auto sleep data in the auto sleep timer work area M103 becomes "0".

An auto power-off work area M104 serves as an area in which the auto power-off data HD203 is written when the auto power-off timer is started. The auto power-off data in the auto power-off work area M104 is subtracted in response to a timer interrupt of the CPU 17, and the auto power-off is carried out when the auto power-off data in the auto power-off work area M104 becomes "0". An auto sleep data 2 area M105 will be described in a fourth exemplary embodiment.

Figure 5:
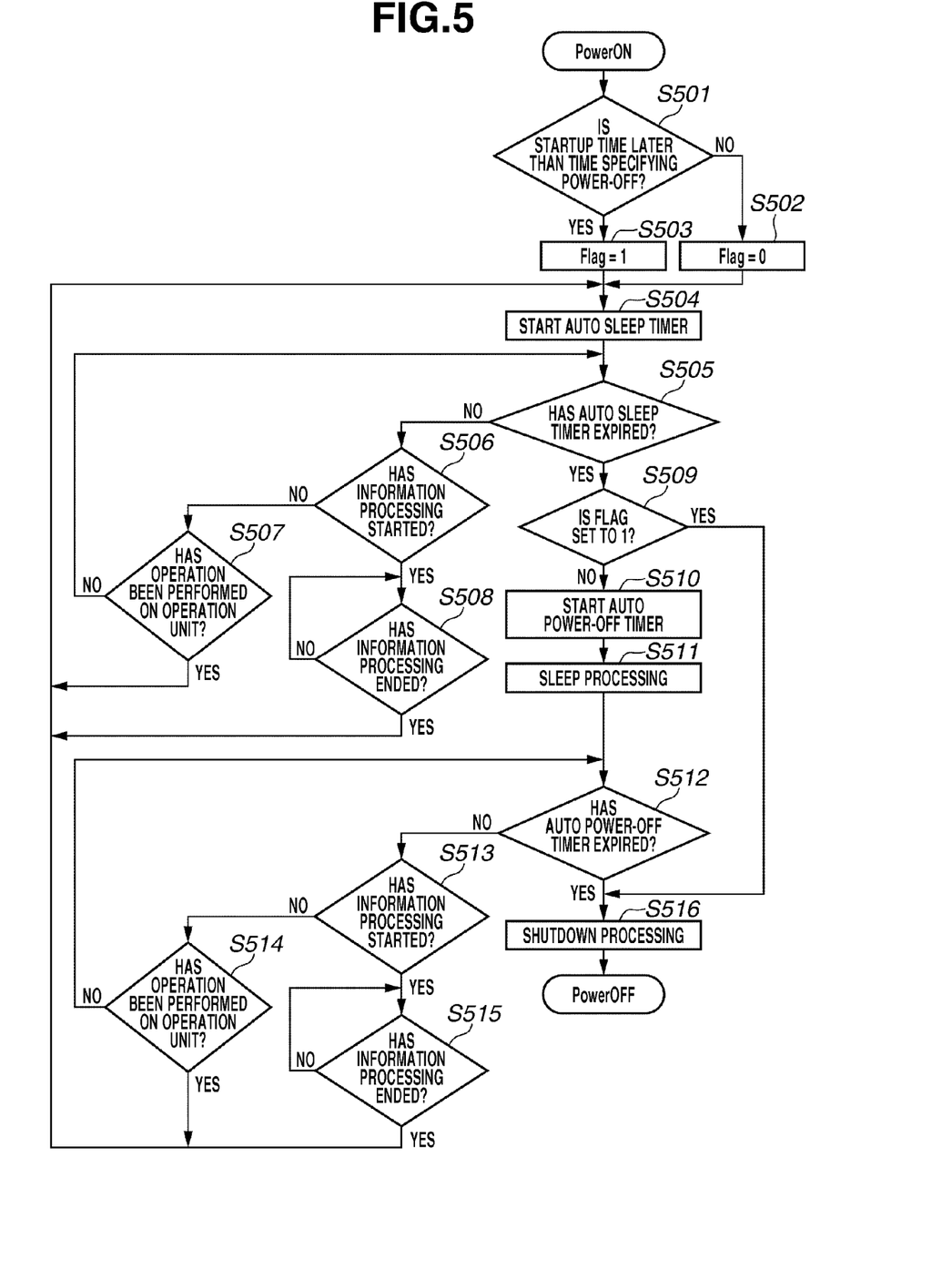
FIG. 5 is a flowchart illustrating exemplary operations in power supply off processing according to the first exemplary embodiment.

FIG. 5 is a flowchart illustrating exemplary operations in the power supply off processing in the first exemplary embodiment. Here, the CPU 17 reads a program that is computer-readably recorded in the HDD 16 and executes the program to implement the processing in the flowchart.

First, when the program is started, the CPU 17 obtains the startup time from the RTC 21 through the RTC I/F and stores the startup time in the startup time storage area M101. In step S501, the CPU 17 carries out startup time determination processing. In the startup time determination processing, the CPU 17 reads the startup time from the startup time storage area M101 and determines whether the startup is prior to or later than the time specified for power-off. This processing in step S501 will be described later in detail with reference to FIGS. 6A and 6B.

If the CPU 17 determines that the startup time precedes the time specified for power-off (NO in step S501), in step S502, the CPU 17 sets the flag data in the flag data area M102 of the memory 18 to "0" (Flag=0), and the processing proceeds to step S504.

On the other hand, if the CPU 17 determines that the startup time comes later than the time specified for power-off (YES in step S501), in step S503, the CPU 17 sets the flag data in the flag data area M102 of the memory 18 to "1" (Flag=1), and the processing proceeds to step S504.

In step S504, the CPU 17 starts the auto sleep timer, and the processing proceeds to step S505. In step S505, the CPU 17 determines whether the auto sleep timer has expired. If the CPU 17 determines that the auto sleep timer has not expired (NO in step S505), the processing proceeds to step S506.

In step S506, the CPU 17 determines whether processing (e.g., printing) has started in the information processing apparatus. If the CPU 17 determines that processing has not started in the information processing apparatus (NO in step S506), the processing proceeds to step S507.

In step S507, the CPU 17 determines whether an operation has been performed on the operation unit 20, through the operation unit I/F. If the CPU 17 determines that an operation has not been performed on the operation unit 20 (NO in step S507), the processing returns to step S505.

On the other hand, if the CPU 17 determines in step S507 that an operation has been performed on the operation unit 20 (YES in step S507), the processing returns to step S504, and the CPU 17 carries out control to restart the auto sleep timer.

If the CPU 17 determines in step S506 that processing has started in the information processing apparatus (YES in step S506), in step S508, the CPU 17 stands by until the processing ends. If the CPU 17 determines that the processing has ended (YES in step S508), the processing returns to step S504, and the CPU 17 carries out control to restart the auto sleep timer.

If the CPU 17 determines in step S505 that the auto sleep timer has expired (YES in step S505), the processing proceeds to step S509. In step S509, the CPU 17 checks the flag data stored in the flag data area M102 of the memory 18 to determine whether the flag data is set to "1" (Flag=1).

If the CPU 17 determines that the flag data is set to "1" (Flag=1) (YES in step S509), in step S516, the CPU 17 carries out shutdown processing of the information processing apparatus. In the shutdown processing, the CPU 17 outputs the relay disconnect instruction signal to the power supply relay unit 11 and then outputs the power supply switch control signal to the power supply switch unit 10 to power off the information processing apparatus (second power-off processing).

On the other hand, if the CPU 17 determines that the flag data is not set to "1" (Flag=0) (NO in step S509), the processing proceeds to step S510. In step S510, the CPU 17 starts the auto power-off timer, and in step S511, the CPU 17 carries out sleep processing.

In step S512, the CPU 17 determines whether the auto power-off timer has expired. If the CPU 17 determines that the auto power-off timer has not expired (NO in step S512), the processing proceeds to step S513.

In step S513, the CPU 17 determines whether processing (e.g., printing) has started in the information processing apparatus. If the CPU 17 determines that processing has not started in the information processing apparatus (NO in step S513), the processing proceeds to step S514.

In step S514, the CPU 17 determines whether an operation has been performed on the operation unit 20, through the operation unit I/F. If the CPU 17 determines that an operation has not been performed on the operation unit 20 (NO in step S514), the processing returns to step S512.

On the other hand, if the CPU 17 determines in step S514 that an operation has been performed on the operation unit 20 (YES in step S514), the processing returns to step S504, and the CPU 17 carries out control to restart the auto sleep timer.

If the CPU 17 determines in step S513 that processing has started in the information processing apparatus (YES in step S513), in step S515, the CPU 17 stands by until the processing ends. If the CPU 17 determines that the processing has ended (YES in step S515), the processing returns to step S504, and the CPU 17 carries out control to restart the auto sleep timer.

If the CPU 17 determines in step S512 that the auto power-off timer has expired (YES in step S512), in step S516, the CPU 17 carries out shutdown processing of the information processing apparatus. In the shutdown processing, the CPU 17 outputs the relay disconnect instruction signal to the power supply relay unit 11 and then outputs the power supply switch control signal to the power supply switch unit 10 to power off the information processing apparatus (first power-off processing).

Through the processing described thus far, the relay and the power supply switch are brought to the OFF state, and thus the electric power supply to the printer 1 is stopped.

Figure 6A:
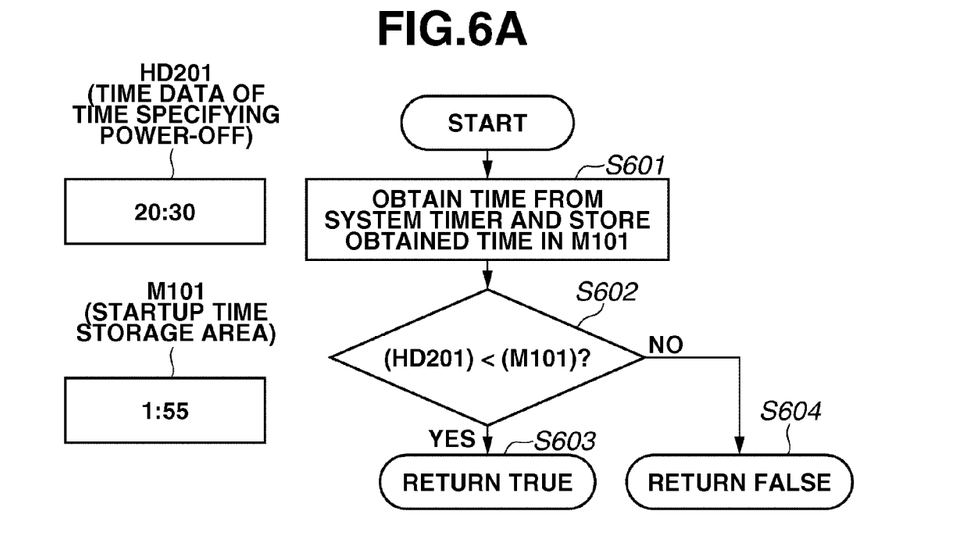
FIGS. 6A and 6B are flowcharts each illustrating exemplary operations in startup time determination processing in step S501 of FIG. 5.
Figure 6B:
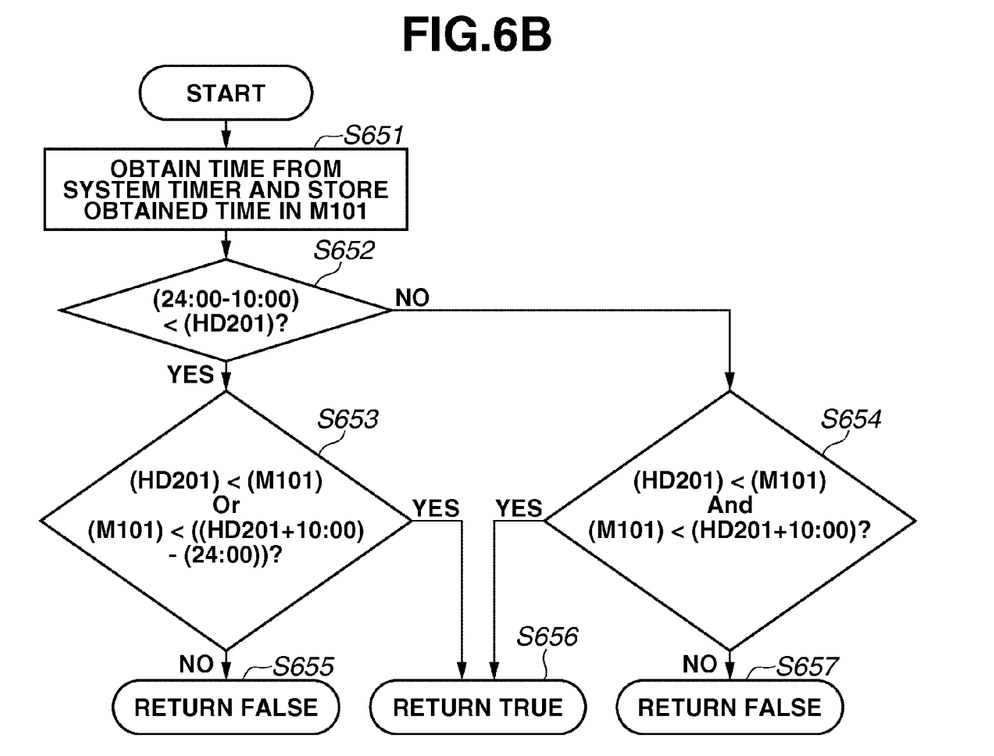

FIGS. 6A and 6B are flowcharts each illustrating an example of the startup time determination processing in step S501 of FIG. 5, and two examples are illustrated in FIGS. 6A and 6B. Here, the CPU 17 reads a program that is computer-readably recorded in the HDD 16 and executes the program to implement the processing in the flowchart. Either of the examples illustrated in FIGS. 6A and 6B may be employed.

In the following description, the time specifying power-off is set at 20:30. In the example illustrated in FIG. 6A, in step S601, the CPU 17 obtains the time from a system timer at the time of startup and stores the obtained time in the startup time storage area M101. Then, in step S602, the CPU 17 compares the startup time with the time data HD201 for the time specifying power-off. If the CPU 17 determines that the startup time exceeds the time data HD201 for the time specifying power-off (YES in step S602), the CPU 17 determines that the startup has occurred after the time specifying power-off and returns "TRUE" in step S603.

On the other hand, if the CPU 17 determines that the startup time is equal to or less than the time data HD201 for the time specifying power-off (NO in step S602), the CPU 17 determines that the startup is not later than the time specifying power-off and returns "FALSE" in step S604.

Another example of the startup time determination processing illustrated in FIG. 6B will be described as follows. In the example illustrated in FIG. 6B, the CPU 17 makes a determination concerning the startup time based on whether the startup time falls within a period having a predetermined offset from the time data HD201 for the time specifying power-off. It is assumed in this example that an offset of 10:00 is employed.

In step S651, the CPU 17 obtains the time from a system timer at the time of startup and stores the obtained time in the startup time storage area M101. Then, in step S652, the CPU 17 determines whether an offset time of the time data HD201 for the time specifying power-off (i.e., time that elapses after the time data HD201 by an amount of offset (a predetermined time)) is before or past midnight. For example, if "24:00-offset (10:00)" is less than the time data HD201 for the time specifying power-off, the CPU 17 determines the offset time is past midnight.

If the CPU 17 determines that the offset time is past midnight (YES in step S652), the processing proceeds to step S653. In step S653, the CPU 17 determines whether the startup time exceeds the time data HD201 (HD201<M101) or whether the startup time is less than the offset time that is past midnight (M101<HD201+10:00−24:00).

If the CPU 17 determines that the startup time exceeds the time data HD201 or that the startup time is less than the offset time which is past midnight (YES in step S653), in step S656, the CPU 17 returns "TRUE".

On the other hand, if the CPU 17 determines that the startup time is equal to or less than the time data HD201 and that the startup time is equal to or greater than the offset time which is past midnight (NO in step S653), in step S655, the CPU 17 returns "FALSE".

If the CPU 17 determines in step S652 that the offset time of the time data HD201 for the time specifying power-off does not cross midnight (NO in step S652), the processing proceeds to step S654.

In step S654, the CPU 17 determines whether the startup time exceeds the time data HD201 (HD201<M101) and whether the startup time is less than the offset time (M101<HD201+10:00).

If the CPU 17 determines that the startup time exceeds the time data HD201 and that the startup time is less than the offset time (YES in step S654), in step S656, the CPU 17 returns "TRUE".

On the other hand, if the CPU 17 determines that the startup time is equal to or less than the time data HD201 or that the startup time is equal to or greater than the offset time (NO in step S654), in step S657, the CPU 17 returns "FALSE". As illustrated above, if, for example, the startup time is "1:55", the CPU 17 determines that the startup has not occurred after the time specifying power-off, in the determination processing illustrated in FIG. 6A. However, in the determination processing illustrated in FIG. 6B, the CPU 17 determines that the startup has occurred after the time specifying power-off.

Figure 7A:
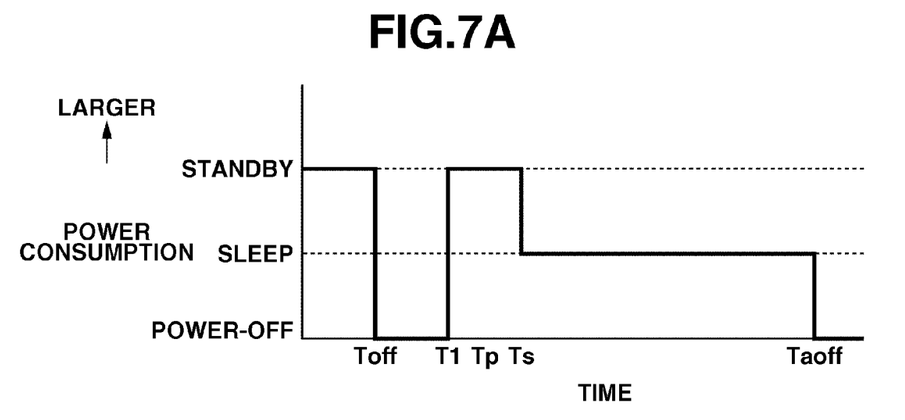
FIGS. 7A and 7B are timing charts each illustrating an effect of power saving processing in the information processing apparatus of the first exemplary embodiment.
Figure 7B:
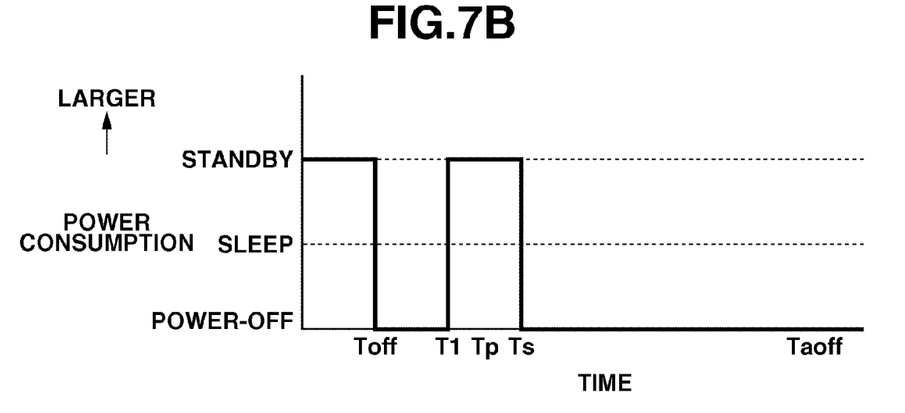

FIGS. 7A and 7B are timing charts each illustrating an effect of power saving processing in the information processing apparatus of the present exemplary embodiment. In each of FIGS. 7A and 7B, the vertical axis represents the power consumption, and the horizontal axis represents the time. In FIGS. 7A and 7B, Toff is time for the time specifying power-off, T1 is startup time, Ts is an auto sleep timer, Taoff is an auto power-off timer, and Tp is print paper discharge time.

FIG. 7A illustrates power consumption in the information processing apparatus that is configured not to carry out the startup time determination processing. In the information processing apparatus that is configured not to carry out the startup time determination processing, the processes in steps S501 and S502 of FIG. 5 are not carried out, and if the determination result is YES in step S505, the processing proceeds to step S510. FIG. 7B illustrates power consumption in the information processing apparatus that is configured to carry out the startup time determination processing. The information processing apparatus of the present exemplary embodiment carries out the processing illustrated in FIG. 5.

In FIG. 7A, after the information processing apparatus is powered off at the time Toff, the main switch is switched on at T1 to turn on the power supply. Then, when printing finishes at Tp, the auto sleep timer is started. When the auto sleep timer expires at Ts, the auto power-off timer is started, and the information processing apparatus enters the sleep mode. When the auto power-off timer expires, the auto power-off is carried out at Taoff to power off the information processing apparatus. In this manner, the information processing apparatus that is configured not to carry out the startup time determination processing consumes power in the sleep mode for a period from Ts to Taoff.

In FIG. 7B, if the CPU 17 determines that the startup time T1 has passed the specified time Toff for the time specifying power-off in the startup time determination processing (step S501 of FIG. 5), when printing finishes at Tp, the auto sleep timer is started. When the auto sleep timer expires at Ts, the information processing apparatus is powered off without starting the auto power-off timer.

In this manner, in the information processing apparatus that is configured to carry out the startup time determination processing, power does not need to be supplied to the information processing apparatus for the period from Ts to Taoff, in which the auto power-off timer expires, and thus power consumption can be reduced in the information processing apparatus.

As described above, according to the present exemplary embodiment, by counting time during which an operation on the operation unit 20 or an information processing operation (e.g., print processing) is not carried out, an operation on the operation unit 20 or an information processing operation can be made immediately, within a time frame (i.e., auto sleep time) which a user has selected considering convenience. Further, the sleep mode, in which power consumption is reduced, is retained until the auto power-off during which the main switch needs to be turned on, is carried out. After the auto power-off is carried out, the power supply of the apparatus can be shut down reliably.

If the apparatus is started after the time specifying power-off, the auto power-off is performed at the time of carrying out the auto sleep. Thus, it is possible to shut down the power supply reliably and suppress unnecessary power consumption without decreasing user-friendliness.

The first exemplary embodiment employs the configuration in which the RTC 21 is provided and the startup time is obtained from the RTC 21. A second exemplary embodiment employs a configuration in which the PC 2 serves as a network time protocol (NTP) server and the time is obtained from the PC 2 at the time of startup. Hereinafter, the second exemplary embodiment will be described.

In the second exemplary embodiment, a user can input time zone data through the operation unit 20 illustrated in FIG. 1. If the time zone data is input, the CPU 17 stores the input time zone data in the time zone data HD204 illustrated in FIG. 4.

Then, at startup, the CPU 17 obtains time information from the PC 2. Typically, this time information is a universal time coordinated (UTC) time. The CPU 17 converts the time information obtained from the PC 2, based on the time zone data HD204 and stores the result in the startup time storage area M101. The remaining processing is similar to that of the first exemplary embodiment, and thus description thereof will be omitted.

The configuration described above does not require the RTC 21 and is inexpensive, however, can achieve an advantageous effect of the present invention.

Figure 8:
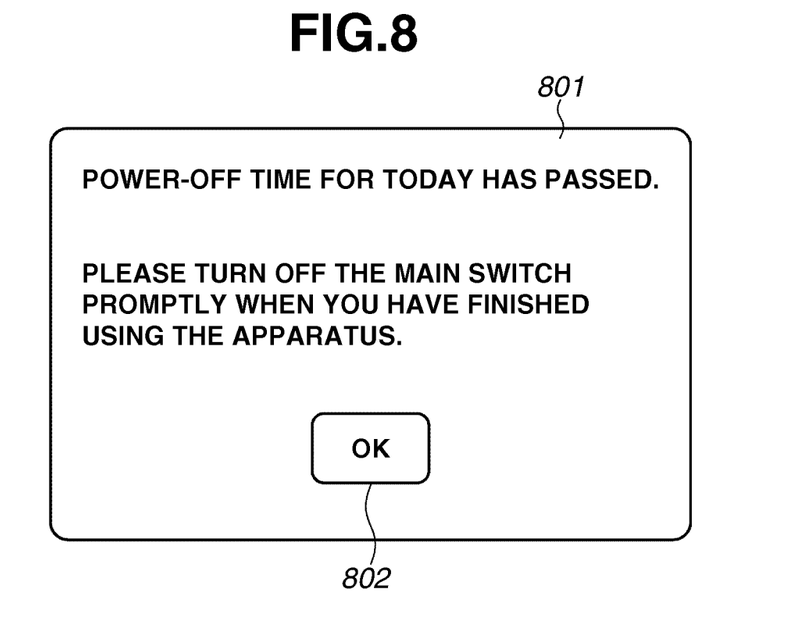
FIG. 8 is a diagram illustrating an exemplary operation screen in a third exemplary embodiment.

In a third exemplary embodiment, an advantageous effect of the present invention can be obtained by a configuration that carries out the following processing. FIG. 8 illustrates an example operation screen in the third exemplary embodiment. If the CPU 17 determines that the apparatus has been started up after the time specifying power-off in the startup time determination processing (YES in step S501 of FIG. 5), the operation screen illustrated in FIG. 8 is displayed on the screen of the operation unit 20 while the CPU 17 sets "1" in the flag data area M102 in step S503 of FIG. 5.

As illustrated in FIG. 8, the operation screen displays a warning message 801 and an "OK" button 802. The warning message 801 may state, for example, "power-off time for today has passed" and "please turn off the main switch promptly when you have finished using the apparatus." When the user presses (touches) the "OK" button 802, the CPU 17 makes the apparatus available.

Such an operation screen can remind the user to power off the apparatus when the user has finished using the apparatus in a case where the apparatus is started after the time specifying power-off, and thus can warn the user to suppress unnecessary power consumption. If the user powers off the apparatus promptly when the user has finished using the apparatus because of the warning, unnecessary power consumption can be suppressed, which achieves the advantageous effect of the present invention.

Figure 9:
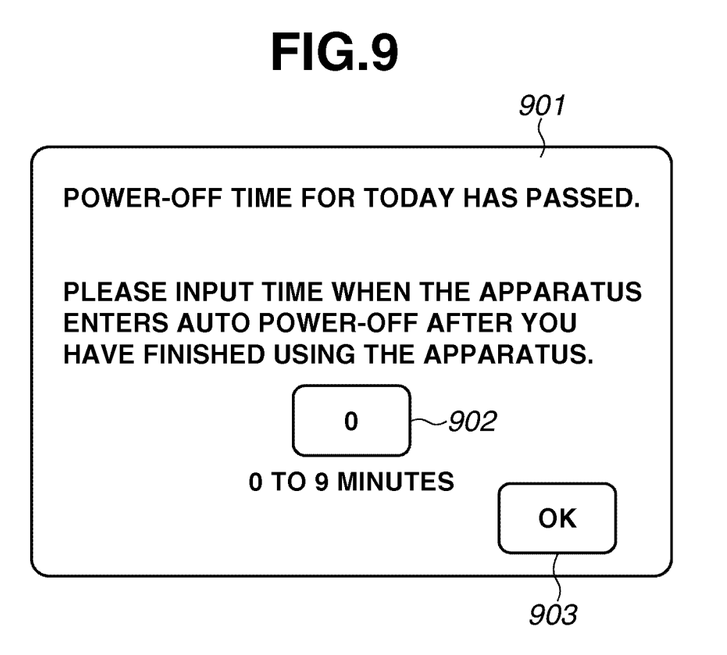
FIG. 9 is a diagram illustrating an exemplary operation screen in a fourth exemplary embodiment.
Figure 10:
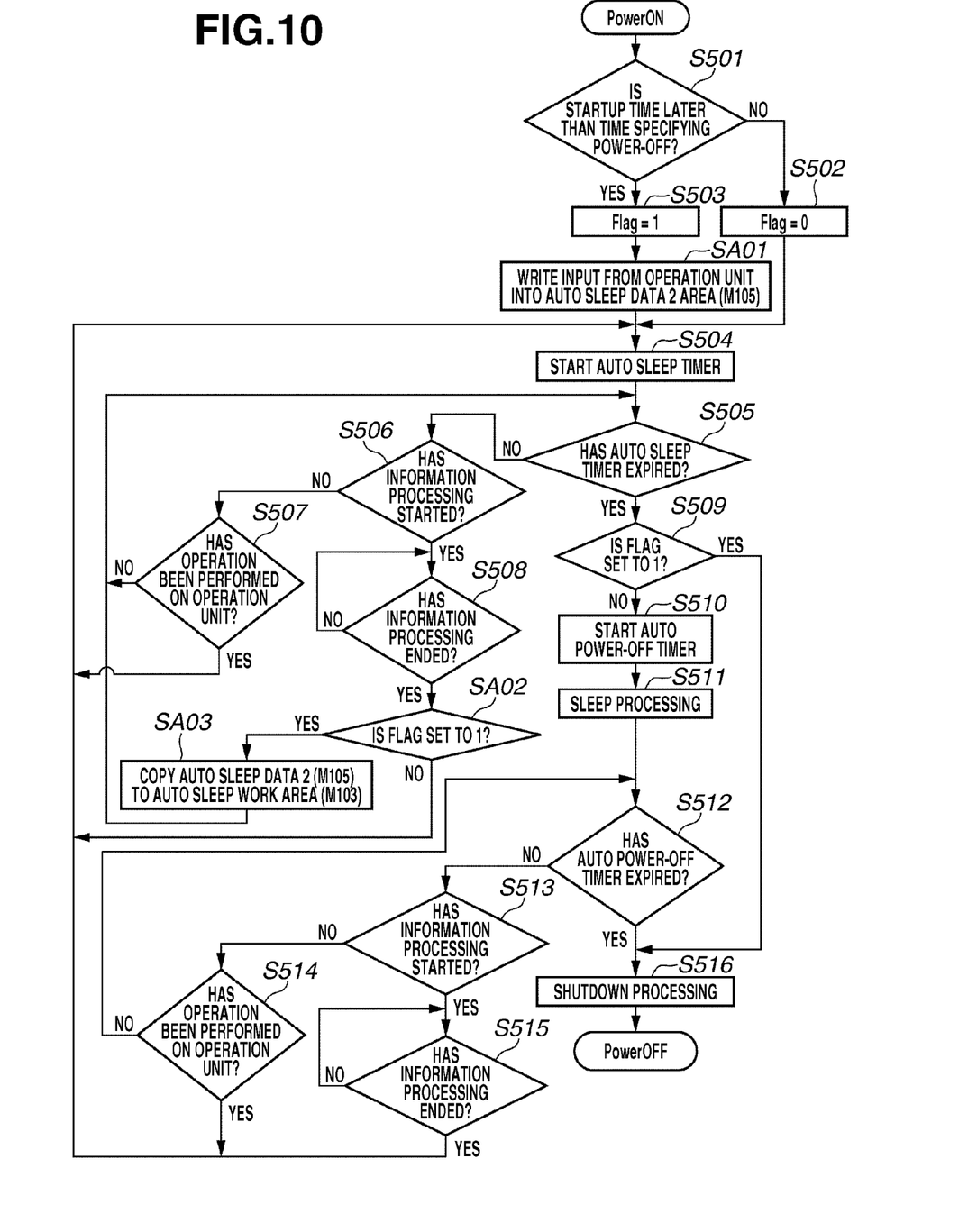
FIG. 10 is a flowchart illustrating exemplary operations in the power supply off processing in the fourth exemplary embodiment.

In a fourth exemplary embodiment, an advantageous effect of the present invention can be obtained by a configuration that carries out the following processing. Hereinafter, the fourth exemplary embodiment will be described with reference to FIGS. 9 and 10. FIG. 9 illustrates an exemplary operation screen in the fourth exemplary embodiment. FIG. 10 is a flowchart illustrating exemplary operations in turning off power supply in the fourth exemplary embodiment. The CPU 17 reads a program that is computer-readably recorded in the HDD 16 and executes the program to implement the processing in the flowchart. Steps S501 to S516 of FIG. 10 are identical to steps S501 to S516 of FIG. 5, and thus description thereof will be omitted.

If the CPU 17 determines that the apparatus has been started up after the time specifying power-off in the startup time determination processing (YES in step S501 of FIG. 5), the operation screen illustrated in FIG. 9 is displayed on the screen of the operation unit 20, while the CPU 17 sets "1" in the flag data area M102 in step S503 of FIG. 5.

As illustrated in FIG. 9, the operation screen displays a warning message 901, a power-off time display field 902, and an "OK" button 903. The warning message 901 may state, for example, "power-off time for today has passed" and "please input time that the apparatus enters auto power-off after you have finished using the apparatus."

When the user inputs, through the operation unit 20, the time that the apparatus enters auto power-off after the user has finished using the apparatus, the CPU 17 displays the input time in the power-off time display field 902. When the user presses (touches) the "OK" button 903, in step SA01 of FIG. 10, the CPU 17 writes the data displayed in the power-off time display field 902 to the auto sleep data 2 area M105 illustrated in FIG. 4. The processing then proceeds to step S504, and the apparatus becomes operable.

In step S508, if the CPU 17 determines that the information processing has ended (YES in step S508), the processing proceeds to step SA02. In step SA02, the CPU 17 checks the flag data stored in the flag data area M102 of the memory 18 to determine whether the flag data is set to "1" (Flag=1).

If the CPU 17 determines that the flag data is set to "1" (Flag=1) (YES in step SA02), the processing proceeds to step SA03. In step SA03, the CPU 17 copies the value in the auto sleep data 2 area M105, which has been written in step SA01, to the auto sleep work area M103, and the processing returns to step S505.

That is, if the apparatus is started after the time specifying power-off, the user inputs the setting time of the auto power-off after the user has finished using the apparatus. If the user inputs, for example, "0", the auto power-off can be carried out immediately after the user has finished using the apparatus.

In FIG. 10, the processing returns to step S505 after step SA03 has been carried out. Alternatively, the processing may return to step S504 from step SA03. If the configuration of the fourth exemplary embodiment described above is employed, the auto power-off can also be carried out without decreasing user-friendliness, and the advantageous effect of the present invention can be achieved.

Hereinafter, a fifth exemplary embodiment will be described. In the first exemplary embodiment, if the apparatus is started after the time specifying power-off, the apparatus is powered off at the time of entering the auto sleep (i.e., when the auto sleep timer expires). However, the timing of power-off in a case where the apparatus is started after the time specifying power-off, is not limited to the timing of entering the auto sleep (i.e., when the auto sleep timer expires). The apparatus may be powered off at any timing as long as the apparatus is powered off without waiting for the auto power-off timer to expire.

For example, (1) the apparatus may be powered off immediately after information processing (e.g., printing) ends. As another example, (2) the apparatus may be powered off at a predetermined timing (i.e., timing that can be set by the user) between end of the information processing and expiration of the auto sleep timer. As yet another example, (3) the apparatus may be powered off at a timing (i.e., timing that can be set by the user) after end of the information processing and end of expiration of the auto sleep timer, and before expiration of the auto power-off timer.

Furthermore, the apparatus may be configured such that the user can select the timing described in the first exemplary embodiment or any one of the three timings (1) to (3) described above. If the configuration of the fifth exemplary embodiment described above is employed, the auto power-off can also be carried out without decreasing user-friendliness, and the advantageous effect of the present invention can be achieved.

As described above, the fifth exemplary embodiment enhances user-friendliness with the use of the auto sleep, allowing the user to use the apparatus at any time without manually operating the main switch until the auto power-off, and the power supply can be shut down reliably through the auto power-off. If the apparatus is started after the apparatus is powered off through the time specifying power-off, the apparatus can be powered off, for example, at a timing of entering the sleep mode through the auto sleep without waiting for the auto power-off. Thus, the power supply of the apparatus can be shut down at an optimal timing that does not decrease user-friendliness and that suppresses unnecessary power consumption.

The structures and the contents of the various pieces of data described above are not limitative. The various structures and contents can be employed in accordance with the use and the purpose. Thus far, several exemplary embodiments have been described. However, the exemplary embodiments of the present invention can also be implemented, for example, as a system, an apparatus, a method, a program, and a storage medium. Specifically, the present invention may be applied to a system that is constituted by a plurality of devices or to an apparatus that is constituted by a single device. Furthermore, a configuration in which the exemplary embodiments described above are combined also falls within the exemplary embodiments of the present invention.

Other Embodiments

An exemplary embodiment of the present invention is also realized by carrying out the following processing. That is, software (program) that realizes the functions of the exemplary embodiments described above is supplied to a system or an apparatus through a network or various storage media, and then a computer (or a CPU and a microprocessor unit (MPU)) in the system or the apparatus reads and executes the program.

Further, the exemplary embodiment of the present invention may be applied to a system that is constituted by a plurality of devices or to an apparatus that is constituted by a single device. The present invention is not limited to the exemplary embodiments described above. Various modifications (including an organic combination of the exemplary embodiments above) can be made based on the spirit of the present invention, and such modifications are encompassed within the scope of the present invention. That is, any configuration in which the exemplary embodiments and modifications thereof described above are combined also falls within the present invention.

According to the exemplary embodiments of the present invention, when an apparatus that has been powered off automatically at specified time is restarted, the power supply of the apparatus can be shut down reliably at a timing that does not decrease user-friendliness and suppresses unnecessary power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-229494 filed Oct. 17, 2012, which is hereby incorporated by reference herein in its entirety.

What is claimed is:

1. An information processing apparatus comprising:
   a first power-off unit configured to turn off the information processing apparatus when a first time has elapsed without receiving user operation, and
   a second power-off unit configured to turn off the information processing apparatus at a specified time,
   wherein the first power-off unit is configured to turn off the information processing apparatus before the first time elapses if the information processing apparatus has been started before an offset time has elapsed after the second power-off unit has turned off the information processing apparatus at the specified time.

2. The information processing apparatus according to claim 1, further comprising:
   a sleep unit configured to shift the information processing apparatus into a sleep mode from a standby mode if a second time has elapsed in the standby mode.

3. The information processing apparatus according to claim 2, wherein the first power-off unit is configured to turn off the information processing apparatus before the sleep unit shifts the information processing apparatus into the sleep mode from the standby mode.

4. The information processing apparatus according to claim 1, wherein the first power-off unit is configured to turn off the information processing apparatus when a second time, which is shorter than the first time, has elapsed.

5. The information processing apparatus according to claim 4, further comprising:
   a receiving unit configured to receive the second time from a user.

6. The information processing apparatus according to claim 1, wherein the first power-off unit does not turn off the information processing apparatus before information processing has ended.

7. The information processing apparatus according to claim 1, further comprising:
   a display unit configured to display a warning screen that prompts a user to power off the information processing apparatus if the information processing apparatus has been started before the offset time has elapsed after the second power-off unit has turned off the information processing apparatus at the specific time.

8. The information processing apparatus according to claim 1, wherein the information processing apparatus is an image forming apparatus.

9. A method for controlling an information processing apparatus comprising:
   first powering off the information processing apparatus when a first time has elapsed without receiving user operation;
   second powering off the information processing apparatus at a specified time;
   determining whether the information processing apparatus has been started after the time specifying power-off processing; and
   third powering off the information processing apparatus before the first time elapses if it is determined that the information processing apparatus has been started before an offset time has elapsed after the second power-off unit has turned off the information processing apparatus at the specified time.

* * * * *